United States Patent
Wei et al.

(10) Patent No.: US 11,250,771 B2
(45) Date of Patent: Feb. 15, 2022

(54) DISPLAY DEVICE WITH DISTRIBUTED ARRAYS OF DRIVER CIRCUITS AND SENSORS

(71) Applicant: Huayuan Semiconductor (Shenzhen) Limited Company, Shenzhen (CN)

(72) Inventors: Chih-Chang Wei, Taoyuan (TW); Junjie Zheng, Cupertino, CA (US); Richard Landry Gray, Taipei (TW); Ping-Yuan Lin, New Taipei (TW); Jyun-Long Lin, New Taipei (TW)

(73) Assignee: Huayuan Semiconductor (Shenzhen) Limited Company, Shenzhen (CN)

( * ) Notice: Subject to any disclaimer, the term of this patent is extended or adjusted under 35 U.S.C. 154(b) by 0 days.

(21) Appl. No.: 17/109,066

(22) Filed: Dec. 1, 2020

(65) Prior Publication Data

US 2021/0366374 A1 Nov. 25, 2021

Related U.S. Application Data

(60) Provisional application No. 63/059,737, filed on Jul. 31, 2020, provisional application No. 63/042,548, filed on Jun. 22, 2020, provisional application No. 63/029,389, filed on May 22, 2020.

(51) Int. Cl.
*G09G 3/3208* (2016.01)

(52) U.S. Cl.
CPC ..... *G09G 3/3208* (2013.01); *G09G 2330/028* (2013.01)

(58) Field of Classification Search
CPC .... G09G 3/3208; G09G 3/2088; G09G 3/342; G09G 2330/028; G09G 2300/0819
See application file for complete search history.

(56) References Cited

U.S. PATENT DOCUMENTS

| | | | |
|---|---|---|---|
| 10,490,143 B2 * | 11/2019 | Kumamoto | F21V 19/00 |
| 10,593,256 B2 * | 3/2020 | Li | G06F 3/1446 |
| 10,789,896 B2 * | 9/2020 | Liu | G09G 3/342 |
| 10,909,911 B1 * | 2/2021 | Zheng | G09G 3/20 |
| 10,950,194 B1 * | 3/2021 | Chan | G06F 3/1446 |
| 2006/0092346 A1 * | 5/2006 | Moon | G02F 1/133603 349/61 |
| 2007/0035706 A1 * | 2/2007 | Margulis | H04N 9/3102 353/122 |
| 2008/0136769 A1 | 6/2008 | Kim et al. | |

(Continued)

OTHER PUBLICATIONS

United States Office Action, U.S. Appl. No. 17/067,432, filed Apr. 6, 2021, 11 pages.

(Continued)

*Primary Examiner* — Mihir K Rayan
(74) *Attorney, Agent, or Firm* — Fenwick & West LLP

(57) ABSTRACT

A display device includes an array of driver circuits distributed in a display area for driving corresponding LED zones and an array of sensor circuits distributed in the display area for sensing conditions associated with the driver circuits or LED zones. Various communication protocols and connectivity configurations may be employed to communicate driver control signals to the driver circuits and to obtain readback data from the sensors. A control circuit adjusts operation of the display device based on sensor data obtained from the sensor.

20 Claims, 12 Drawing Sheets

(56) References Cited

U.S. PATENT DOCUMENTS

| | | | |
|---|---|---|---|
| 2008/0136770 A1* | 6/2008 | Peker | G09G 3/3413 |
| | | | 345/102 |
| 2010/0309100 A1* | 12/2010 | Cok | G09G 3/2085 |
| | | | 345/76 |
| 2011/0109228 A1 | 5/2011 | Shimomura et al. | |
| 2011/0267375 A1 | 11/2011 | Yang et al. | |
| 2012/0050343 A1 | 3/2012 | Kim et al. | |
| 2014/0152902 A1* | 6/2014 | Morrisseau | G06F 13/426 |
| | | | 348/739 |
| 2020/0211496 A1 | 7/2020 | Wang et al. | |
| 2020/0211500 A1 | 7/2020 | Canberk et al. | |
| 2020/0211502 A1 | 7/2020 | Kim et al. | |
| 2020/0212137 A1 | 7/2020 | Wang et al. | |
| 2020/0312220 A1 | 10/2020 | Hussell et al. | |

OTHER PUBLICATIONS

United States Office Action, U.S. Appl. No. 17/067,432, filed May 13, 2021, 13 pages.

\* cited by examiner

DISPLAY DEVICE WITH DISTRIBUTED ARRAYS OF DRIVER CIRCUITS AND SENSORS

CROSS-REFERENCE TO RELATED APPLICATIONS

This application claims the benefit of U.S. Provisional Application No. 63/029,389 filed on May 22, 2020, U.S. Provisional Application No. 63/042,548 filed on Jun. 22, 2020, and U.S. Provisional Application No. 63/059,737 filed on Jul. 31, 2020, which are each incorporated by reference herein.

BACKGROUND

This disclosure relates generally to light emitting diodes (LEDs) and LED driver circuitry for a display, and more specifically to a display architecture with distributed driver circuits.

LEDs are used in many electronic display devices, such as televisions, computer monitors, laptop computers, tablets, smartphones, projection systems, and head-mounted devices. Modern displays include very large numbers of individual LEDs that may be arranged in rows and columns in a display area. In order to drive each LED, current methods employ driver circuitry that requires significant amounts of external chip area that impacts the size of the display device.

SUMMARY

A display device comprises an array of light emitting diode zones each comprising one or more light emitting diodes that generate light in response to respective driver currents. An array of driver circuits are distributed in the display area of the display device that each drive a respective light emitting diode zone by controlling the respective driver currents in response to driver control signals. An array of sensor circuits distributed in display area of the display device output respective readback signals including sensor data in response to command signals. A control circuit generates the command signals for requesting the readback signal, receives the respective readback signals from the sensor circuits, and generates control signals to adjust operation of the display device based at least in part on the readback signals.

In an embodiment, the array of driver circuits are arranged in groups of driver circuits each sharing a common command line for providing the driver control signals and common power supply lines. The array of sensor circuits are also arranged in groups of sensor circuits each sharing a common command line for providing the command signals and common power supply lines.

In another embodiment, the array of driver circuits and the array of sensor circuits are arranged in mixed groups of driver circuits and sensor circuits. Each mixed group shares a common command line for providing control signals, and shares common power supply lines.

In another embodiment, a display device comprises one or more light emitting diodes that generate light in response to respective driver currents. An array of zone integrated circuits are distributed in the display area of the display device. The array of zone integrated circuits are arranged in groups that share a common command line and common power supply lines. Each group of zone integrated circuits includes at least one driver circuit to drive a respective light emitting diode zone by controlling the respective driver currents in response to driver control signals, and at least one sensor circuit to output respective readback signals including sensor data in response to command signals. The control circuit generates the command signals for requesting the readback signal, receives the respective readback signals from the sensor circuits, and generates control signals to adjust operation of the display device based at least in part on the readback signals.

BRIEF DESCRIPTION OF THE DRAWINGS

The teachings of the embodiments of the present invention can be readily understood by considering the following detailed description in conjunction with the accompanying drawings.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive aspect matter.

DETAILED DESCRIPTION OF EMBODIMENTS

A display device includes an array of driver circuits distributed in a display area for driving corresponding LED zones and an array of sensor circuits distributed in the display area for sensing conditions associated with the driver circuits or LED zones. Various communication protocols and connectivity configurations may be employed to communicate driver control signals to the driver circuits and to obtain readback data from the sensors. A control circuit adjusts operation of the display device based on sensor data obtained from the sensors.

Figure 1A:
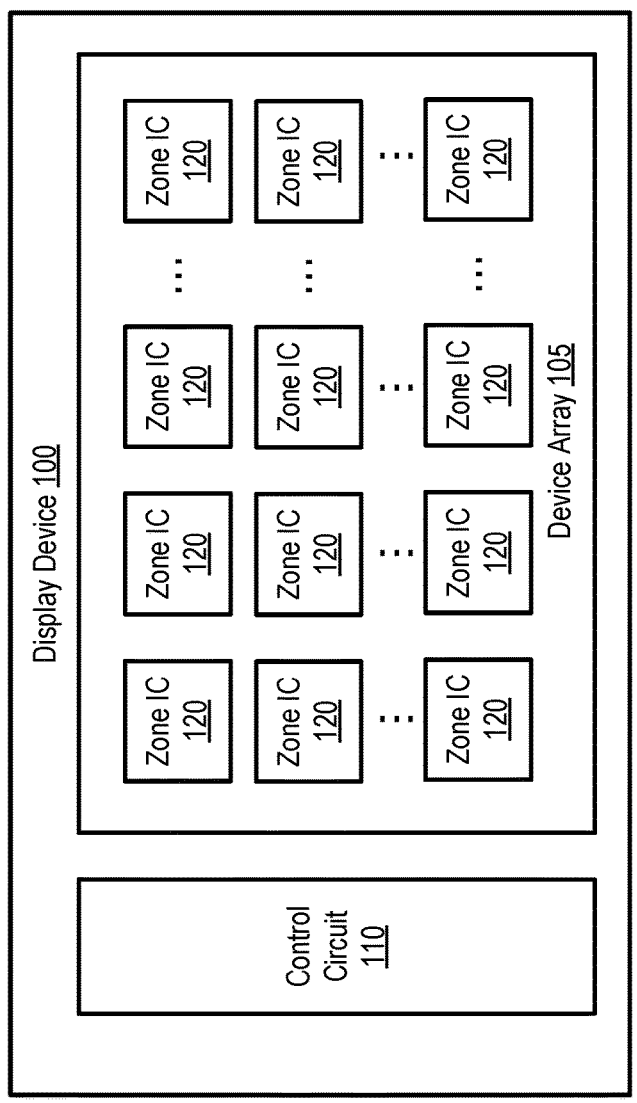
FIG. 1A is a circuit diagram of a display device including distributed zone integrated circuits (ICs) that include a mixture of driver circuits and sensor circuits, according to one embodiment.

FIG. 1A is a circuit diagram of a display device 100 for displaying images or video. In various embodiments, the display device 100 may be implemented in any suitable form-factor, including a display screen for a computer display panel, a television, a mobile device, a billboard, etc. The display device 100 may comprise a liquid crystal display (LCD) device or an LED display device. In an LCD display device, LEDs provide white light backlighting that passes through liquid crystal color filters that control the color of individual pixels of the display. In an LED display device, LEDs are directly controlled to emit colored light corresponding to each pixel of the display.

Figure 1E:
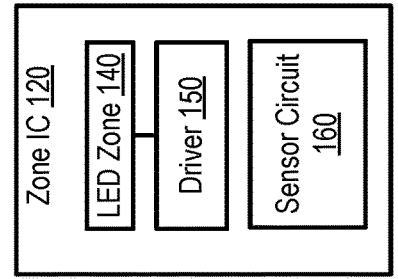
FIG. 1E is a fourth embodiment of a zone IC.
Figure 1D:
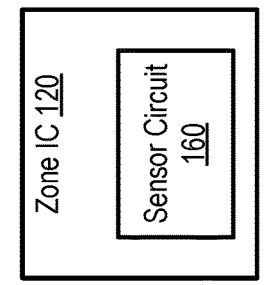
FIG. 1D is a third embodiment of a zone IC.
Figure 1C:
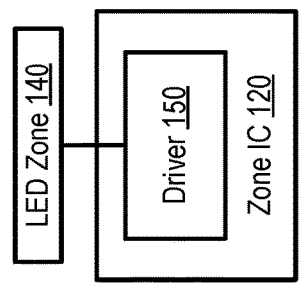
FIG. 1C is a second embodiment of a zone IC.
Figure 1B:
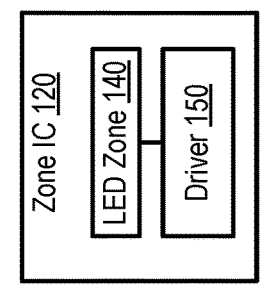
FIG. 1B is a first embodiment of a zone IC.

The display device 100 may include a device array 105 and a control circuit 110. The device array 105 comprises an array of zone integrated circuits (ICs) 120 that may have different configurations examples of which are illustrated in FIGS. 1B-1E. As illustrated in FIG. 1B, a zone IC 120 may include an integrated package including an LED zone 140 and a driver circuit 150 that drives the corresponding LED zone 140. As illustrated in FIG. 1C, a zone IC 120 may comprise a driver circuit 150 that couples to an external LED zone 140 in a separate physical package. As illustrated in FIG. 1D, a zone IC 120 may comprise a sensor circuit 160 such as a temperature sensor, a light sensor, a voltage sensor, an audio sensor, or a device that performs a combination of sensing functions. As illustrated in FIG. 1E, a zone IC 120 may include an integrated package that includes an LED zone 140, a driver circuit 150, and a sensor circuit 160. The device array 105 generally includes a mixture of at least two different types of zone ICs 120, in which some of the zone ICs 120 include driver circuits 150 and at least some of the zone ICs 120 include sensor circuits 160.

As will be described in further detail below, at least some of the zone ICs 120 in the configurations of FIG. 1B or FIG. 1E may be physically structured with LED zones 140 that are stacked over the driver circuits 150. In other words, an array of LED zones 140 are arranged in a first x-y plane and an array of driver circuits 150 are arranged in a second x-y plane parallel to the first x-y plane in which each LED zone 140 is stacked over (i.e., in the z direction) the corresponding driver circuit 150 that drives it. Furthermore, the LED zone 140 and the driver circuit 150 of a zone IC 120 may be integrated on the same substrate and in a same package as further described in FIGS. 8A-10. This structure enables a display device 100 in which the driver circuits 150 are distributed in a display area and therefore enables a more compact display device 100 than in devices where the driver circuits 150 are external to the display area.

The LEDs of each LED zone 140 may be organic light emitting diodes (OLEDs), inorganic light emitting diodes (ILEDs), mini light emitting diodes (mini-LEDs) (e.g., having a size range between 100 to 300 micrometers), micro light emitting diodes (micro-LEDs) (e.g., having a size of less than 100 micrometers), white light emitting diodes (WLEDs), active-matrix OLEDs (AMOLEDs), transparent OLEDs (TOLEDs), or some other type of LEDs.

The LED zones 140 may be arranged in a two-dimensional array (e.g., in rows and columns). In an LCD display, the LED zones 140 can have one or more LEDs that provides backlighting for a backlighting zone, which may include a one-dimensional or two-dimensional array of pixels. In an LED display, the LED zones 140 may comprise one or more LEDs corresponding to a single pixel or may comprise a one-dimensional array or two-dimensional array of LEDs corresponding to an array of pixels (e.g., one or more columns or rows). For example, in one embodiment, the LED zones 140 may comprise one or more groups of red, green, and blue LEDs that each correspond to a sub-pixel of a pixel. In another embodiment, the LED zones 140 may comprise one or more groups of red, green, and blue LED strings that correspond to a column or partial column of sub-pixels or a row or partial row of sub-pixels. For example, an LED zone 140 may comprise a set of red sub-pixels, a set of green sub-pixels, or a set of blue sub-pixels.

In an embodiment, the driver circuits 150 and sensor circuits 160 may similarly be arranged in a two-dimensional array. Zone ICs 120 with driver circuits 150 are generally distributed throughout in the display area to drive corresponding LED zones 140. The sensor circuits 160 may also be distributed throughout the device array 105 to sense conditions relating to operation of a set of one or more adjacent driver circuits 150 as will be described in further detail below. Sensor circuits 160 may be positioned, for example, next to each driver circuit 150 or may be spread out between sets of driver circuits (e.g., one sensor circuit 160 in each row).

The zone ICs 120 may operate in various modes including at least an addressing mode, a configuration mode, and an operational mode. During the addressing mode, the control circuit 110 initiates an addressing procedure to cause assignment of addresses to each of the zone ICs 120. During the configuration and operational modes, the control circuit 110 transmits commands and data that may be targeted to specific zone ICs 120 based on their addresses. In the configuration mode, the control circuit 110 configures driver circuits 150 of the zone ICs 120 with one or more operating parameters (e.g., overcurrent thresholds, overvoltage thresholds, clock division ratios, and/or slew rate control). During the operational mode, the control circuit 110 provides control data to the driver circuits 150 that causes the driver circuits 150 to control the respective driver currents to the LED zones 140, thereby controlling brightness. For example, in each of a sequence of image frames, the control circuit 110 provides driver control signals to the driver circuits 150 that control a driving current of the LED zones 140 (e.g., by controlling a duty cycle and/or current level through one or more LED strings). The control circuit 110 may also issue commands to request readback data from sensor circuits 160, and the sensor circuits 160 provide the sensor data to the control circuit 110 in response to the commands. The control circuit 110 may adjust driver control signals, supply voltage levels, sensor parameters, or other display parameters dependent on the received feedback data from the sensor circuits 160. For example, the control circuit 110 may calibrate the driver circuits 150 based on the sensed data so that LED zones 140 each output the same brightness in response to the same brightness control signal, despite process variations or other sensed conditions that may otherwise cause variations. The calibration process may be performed by measuring light output, channel voltages, temperature, or other data that may affect performances of the LEDs. The calibration process may be repeated over time (e.g., as the display device 100 heats up during operation). The control circuit 110 may furthermore calibrate sensor circuits 160, adjust supply voltage levels, or adjust parameters associated with the display device 100 based on the readback data.

The zone ICs 120 may be connected to the control circuit 110 in groups of zone ICs 120 that share common power lines, ground lines, and/or communication lines. In different embodiments, different connectivity configurations may be employed to couple the control circuit 110 to each group of zone ICs 120. For example, in an embodiment, each group of zone ICs 120 is coupled by a shared parallel communication line that provides the driver control signals and/or readback commands to zone ICs 120 within the group and targets different signals to different zone ICs 120 based on their addresses. The shared parallel communication line may comprise a dedicated communication line or may comprise a power communication line that both provides a supply voltage to the zone ICs 120 and includes digital data modulated on the supply voltage. The zone ICs 120 may furthermore include serial connections between adjacent zone ICs 120 in a group and between the group of zone ICs 120 and the control circuit 110 to form a serial communication chain. The serial communication chain may be utilized to facilitate assignment of addresses to the zone ICs 120 at startup, may be used to communicate various commands to the zone ICs 120, and/or may be used to communicate readback data from the zone ICs 120 to the control circuit 110. In other embodiments, some zone ICs 120 (e.g., zone ICs 120 including driver circuits 150) within a group may be serially connected, while the serial communications lines bypass other zone ICs 120 (e.g., sensor circuits 160) within the group.

Alternatively, the control circuit 110 may include sets of control lines across multiple dimensions to facilitate communication of the driver control signals without addresses. Here, a group of zone ICs 120 along a first dimension (e.g., a row) may be selected based on a first shared control line coupled to all the zone ICs 120 in the group. Then control signals may be communicated in parallel using a set of separate control lines that may be shared between zone ICs 120 along a second dimension (e.g., a column). In some embodiments, a display device 100 may utilize addresses for driver circuits 150 but not for sensor circuits 160. In yet further embodiments, driver circuits 150 may share an address with a corresponding sensor circuit 160 (e.g., an adjacent sensor circuit 160).

Each group of zone ICs 120 may comprise, for example, a row or partial row of zone ICs 120, a column or partial column of zone ICs 120, a block of adjacent zone ICs 120, or any arbitrary subset of the zone ICs 120. In some embodiments, each group of zone ICs 120 is of uniform type such that, for example, some groups of zone ICs 120 comprise driver circuits 150 while other groups of zone ICs 120 comprise sensor circuits 160. In this case, the connectivity configurations in the different types of groups may be different. Alternatively, a group of zone ICs 120 may include a mixture of zone ICs 120 with sensor circuits 160 (e.g., in the configuration of FIG. 1D) and zone ICs with driver circuits 150 (e.g., in the configuration of FIG. 1B or 1C). Here, a set of communication lines may be shared between a set of zone ICs 120 that includes at least one driver circuit 150 and a least one sensor circuit 160. Examples of different connectivity configurations are described in further detail below with respect to FIGS. 2-7.

Figure 2:
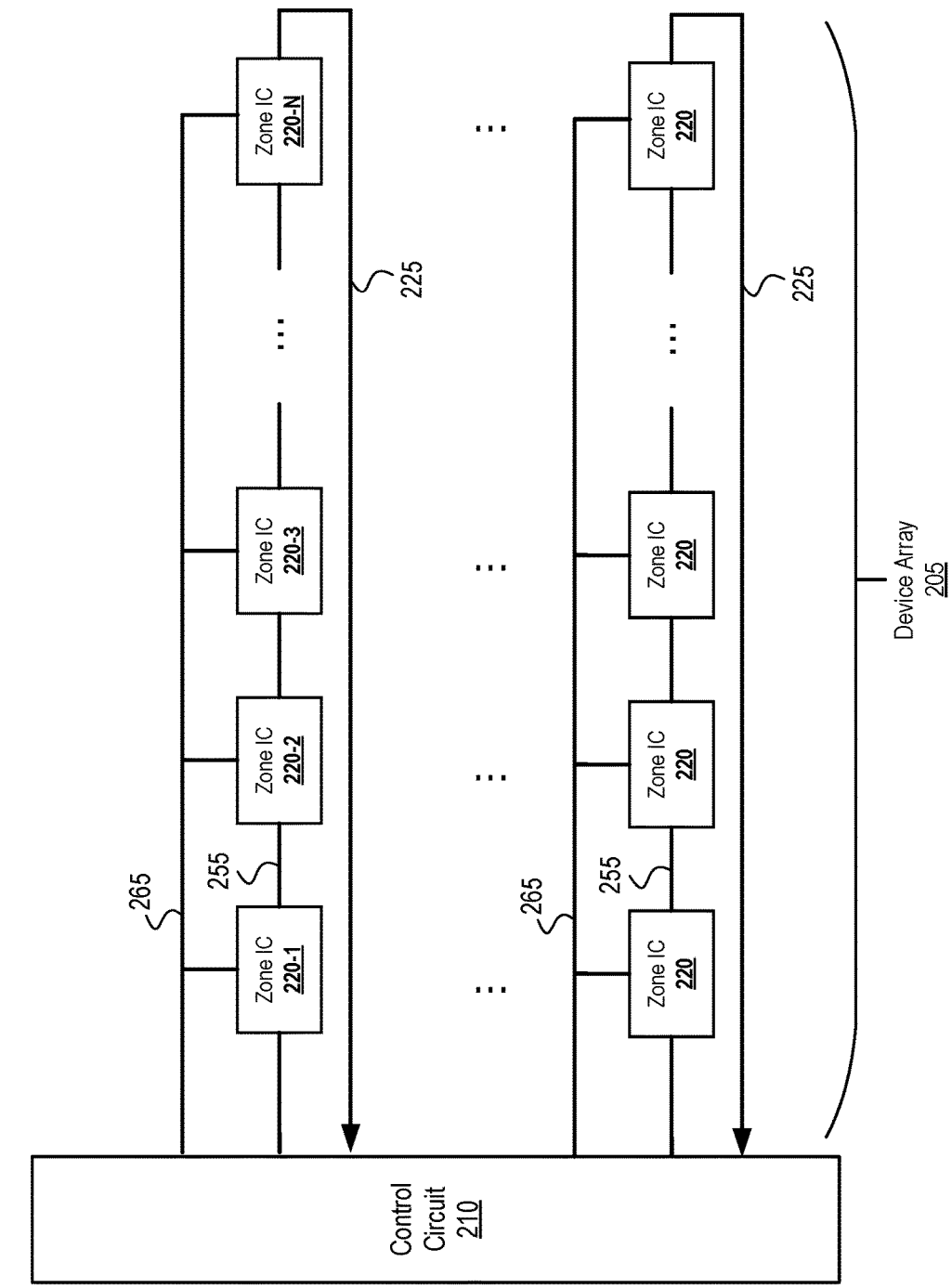
FIG. 2 is a circuit diagram of a display device including groups of zone ICs coupled to provide readback data from sensor circuits to a control circuit via a serial communication chain, according to one embodiment.

FIG. 2 illustrates one example of a connectivity configuration for a device array 205 of a display device 200. In this embodiment, the zone ICs 220 are arranged in groups (e.g., rows) in which the set of zone ICs 220 in each group share common power supply lines and common communication lines. In the illustrated configuration, the zone ICs 220 in a group are coupled in parallel to a shared command line 265. In an embodiment, the shared command line 265 may comprise a power communication line that supplies both power and data to the zone ICs 220 as a supply voltage modulated with digital data. Alternatively, the shared command line 265 may comprise a dedicated signal line and power may be supplied to the zone ICs 220 via a separate dedicated supply line (not shown).

Serial communication lines 255 also couple the zone ICs 220 of a group in series to each other and to the control circuit 210 to enable communications between the zone ICs 220 and the control circuit 210 via a serial communication chain. The serial communication lines 255 may be configured for unidirectional or bidirectional communication in different embodiments. In the case of unidirectional serial communication lines 255, a readback line 225 may couple the last zone IC 220-N in each group to the control circuit 210. In the case of bidirectional serial communication lines 255, the readback line 225 may be optionally omitted.

The serial communication lines 255 may be utilized in the addressing mode to facilitate assignment of addresses. Here, an addressing signal is sent from the control circuit 210 via the serial communication lines 255 to the first zone IC 220-1 in a group of zone ICs 220. The first zone IC 220-1 stores an address based on the incoming addressing signal and generates an outgoing addressing signal for outputting to the next zone IC 220-2 via the serial communication line 255. The second zone IC 220-2 similarly receives the addressing signal from the first zone IC 220-1, stores an address based on the incoming addressing signal, and outputs an outgoing addressing signal to the next zone IC 220-3. This process continues through the chain of zone ICs 220. The last zone IC 220-N may optionally send its assigned address back to the control circuit 210 to enable the control circuit 210 to confirm that addresses have been properly assigned. The addressing process may be performed in parallel or sequentially for each group of zone ICs 220.

In an example addressing scheme, each zone IC 220 may receive an address, store the address, increment the address by one or by another fixed amount, and send the incremented address as an outgoing addressing signal to the next zone IC 220 in the group. Alternatively, each zone IC 220 may receive the address of the prior zone IC 220, increment the address, store the incremented address, and send the incremented address to the next zone IC 220. In other embodiments, the zone IC 220 may generate an address based on the incoming address signal according to a different function (e.g., decrementing).

After addressing, commands may be sent to the zone ICs 220 based on the addresses. The commands may include dimming commands for driver circuits 150 to control dimming of corresponding the LED zones 140 or readback commands for sensor circuits 160 that request readback data.

For dimming commands, the driver circuits 150 receive the dimming data and adjust the driving currents to the corresponding LED zone 140 to achieve the desired brightness. The feedback commands may request information such as channel voltage information, temperature information, light sensing information, status information, fault information, or other data from sensor circuits 160. In response to these commands, the sensor circuits 160 may obtain the data from integrated sensors and send the readback data to the control circuit 210.

Commands may be sent to the zone ICs 220 via the shared command line 265 or via the serial communication lines 255 and serially connected zone ICs 220. If commands are sent via the shared command line 265, the targeted zone IC 220 having the specified address processes the command while the other zone ICs 220 may ignore the command. If the commands are sent via the serial communication lines 255, the zone ICs 220 that are not targeted by the command may propagate the command to an adjacent zone IC 220 via the serial communication lines 255 until it reaches the targeted zone IC 220, which processes the command.

In response to a readback command, the targeted zone IC 220 transmits the requested readback data to the control circuit 220 via the serial communication lines 255. For example, upon receiving a command, a sensor circuit 160 of a targeted zone IC 220 outputs the readback data to an adjacent zone IC 220 via the serial communication lines 255. Each subsequent zone IC 220 receives the readback data and propagates it to the next zone IC 220 in the serial chain until it reaches the control circuit 210. Readback data can propagate through the chain in either direction. For example, the zone ICs 220 may propagate the readback data in a forward direction in which each zone IC 220 outputs the readback data to an adjacent zone IC 220 that is one hop further from the control circuit 210 until it reaches the last zone IC 220, which then returns the readback data via the readback line 225. Alternatively, the zone ICs 220 in a group may propagate the readback data in a backward direction in which each zone IC 220 outputs the readback data to an adjacent zone IC 220 one hop closer to the control circuit 210 until it reaches the control circuit 210. In an embodiment, responses to readback commands may include the address of the targeted zone IC 220 to enable the control circuit 210 to confirm which zone IC 220 provided the response.

In other embodiments, the control circuit 210 may issue a group command that is targeted to the group of zone ICs 220 instead of targeting an individual zone IC 220. In this case, data may be combined by each zone IC 220 as the command and data propagates through the chain to provide a single result to the control circuit 210. For example, in one embodiment, the control circuit 210 may issue a channel sensing command through the serial communication line 255. A sensor circuit 160 associated with the first zone IC 220-1 receives the channel voltage sensing command and outputs the command together with a sensed channel voltage of a corresponding LED zone 140 to the next zone IC 220-2. The next zone IC 220-2 receives the command and the incoming channel voltage value from the previous zone IC 220-2, senses the channel voltage of a corresponding LED zone 140, and applies a function to the incoming channel voltage value and the sensed channel voltage to generate an outgoing channel voltage value that it outputs via the serial communication line 255. Here, the function may comprise a minimum function such that the zone IC 220 compares the received channel voltage with its sensed channel voltage, and outputs via the serial communication line 255, the lower of the received channel voltages from the prior zone IC 220 and the sensed channel voltage from the current zone IC 220. Alternatively, the function may comprise, for example, a max function, an average function, or other function. This process repeats throughout the chain of zone ICs 220 so that each zone IC 220 outputs a resulting value (e.g., a min, max, or average value) based on the sensed channel voltages detected among the current zone ICs 220 and all prior zone ICs 220. In the case that the group of zone ICs 220 includes some zone ICs 220 without channel voltage sensor circuits 160, these zone ICs 220 may propagate the received data without performing any sensing or combining function. The resulting readback data received by the control circuit 210 represents a function (e.g., a min, max, or average) of each of the detected channel voltages of the LED zones 140 associated with the group of zone ICs 220. The control circuit 210 can then set a shared supply voltage for the LED zones 140 in each group or another control parameter according to the readback data. For example, by applying a minimum function to obtain the lowest channel voltage in the group, the control circuit 210 can set the supply voltage for the LED zones 140 to a minimum level sufficient to drive the LED zone 140 with the lowest sensed channel voltage.

In another example, a group command may be utilized for temperature sensing. Here, the command and data are propagated through the serial communication chain in each group of zone ICs 220 as described above. For each zone IC 220 including temperature sensor circuit 160, the zone IC 220 receives a temperature from an adjacent zone IC 220, applies a function to the received temperature and its own sensed temperature to generate an outgoing temperature value, and outputs the outgoing temperature to the next zone IC 220. Zone ICs 220 without temperature sensor circuits 160 may simply propagate the command and data to the next zone IC 220. Thus, the control circuit 210 can obtain a function of the sensed temperatures associated with each of the temperature sensor circuits 160 in the group. Here, the function may comprise, for example, summing or averaging, or detecting a minimum or maximum value. The control circuit 210 can then adjust the operation of the driver circuits 150, the sensor circuits 160, supply voltages, or other parameters of the display device 200 to account for temperature-dependent variations in the outputs of the LED zones 140 associated with the group of temperature sensor circuits 160.

In another example, a group command may be utilized for fault detection. Here, each zone IC 220 may propagate a fault status request command through the chain and set a fault status flag if a fault is detected. The fault status flag may then be propagated to the control circuit 210 to enable the control circuit 210 to detect the faulty zone IC 220 and adjust operation of the display device 200 accordingly. In an embodiment, an address of the faulty zone IC 220 may be sent together with the fault status flag to enable the control circuit 210 to detect the faulty zone IC 220.

Figure 3:
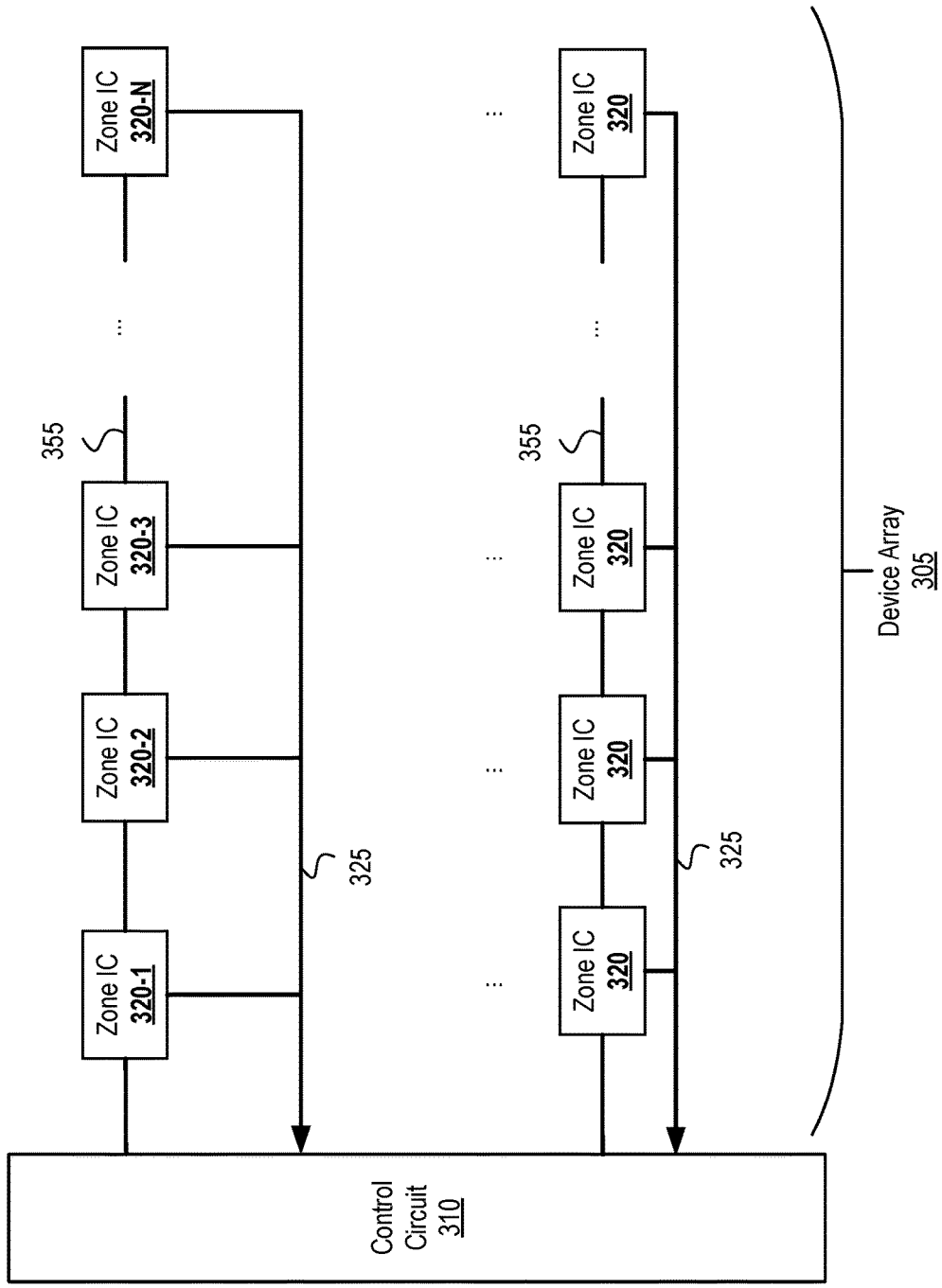
FIG. 3 is a circuit diagram of a display device including groups of zone ICs coupled to provide readback data from sensor circuits to a control circuit via a shared single wire communication line, according to one embodiment.

FIG. 3 illustrates an alternative connectivity configuration for a display device 300. Similar to FIG. 2, the display device 300 includes a control circuit 310 and a device array 305 including an array of zone ICs 320 arranged into groups (e.g., rows). As described above, the zone ICs 320 in each group are coupled to each other and to the control circuit 310 in a serial communication chain via a set of serial communication lines 355. However, instead of providing readback of sensed data via the serial communication chain, each zone IC 320 in a group has parallel connections to a single wire readback line 325. Here, the zone ICs 320 may receive commands through either the serial communication lines 355 as described above or via a power communication line or other dedicated command line (not shown in FIG. 3). The commands generally specify a targeted zone IC 320 (e.g., by specifying an address). The targeted zone IC 320 processes the command and outputs requested readback data on the single wire readback line 325 instead of through a serial communication chain. The other zone ICs 320 may determine that they are not targeted by the command and configure their output pin coupled to the single wire readback line 325 in a high impedance state so that they do not affect the voltage on the single wire readback line 325. The display device 300 may utilize this communication scheme to detect channel voltage of corresponding LED zones 140, temperature data, status information, or other data and adjust operation accordingly as described above. In an embodiment, zone ICs 320 that do not include sensor circuits 160 may lack the connection to the single wire readback line 325.

Additional connectivity configurations for a display device are described in further detail in U.S. patent application Ser. No. 17/067,427 filed on Oct. 9, 2020 entitled "Display Device with Feedback via Serial Connections Between Distributed Driver Circuits" and U.S. patent application Ser. No. 17/067,432 filed on Oct. 9, 2020 entitled "Display Device with Feedback via Parallel Connections from Distributed Driver Circuits to a Single Wire Interface", which are each incorporated by reference herein.

Figure 4:
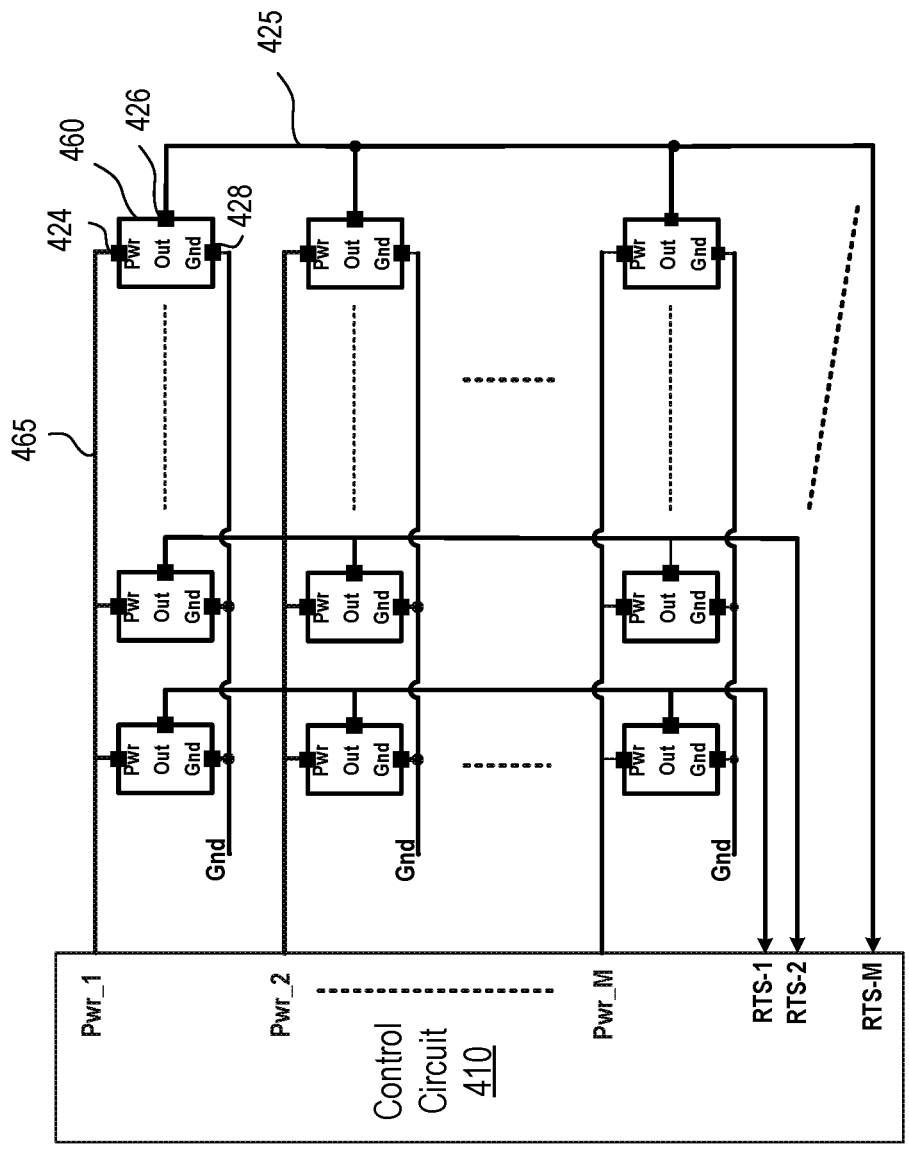
FIG. 4 is a circuit diagram of a display device including an array of sensor circuits coupled to receive commands via shared lines along a first dimension and to provide readback data via shared lines along a second dimension, according to one embodiment.

FIG. 4 illustrates an example of a connectivity configuration for an array of sensor circuits 460 in a display device 400 that does not necessarily require assignment of addresses to the sensor circuits 460. The array of sensor circuits 460 includes a plurality of groups of sensor circuits 460 that each share common ground and power communication lines 465. In the illustrated embodiment, the sensor circuits 460 comprise 3-pin devices including a Pwr pin 424 to receive a power line communication signal from a power communication line 465 that both powers the device 460 and encodes command data, a ground pin 428, and an output pin for providing sensor output 426. The output pins 426 of the sensor circuits 460 in each column are coupled in parallel to respective shared readback lines 425 (i.e., one readback line 425 per column). In an alternative configuration, the sensor circuit 460 may comprise a 4-pin device coupled to separate power lines and command lines in place of the power communication line 465.

The control circuit 410 may initiate readback of the sensor circuits 460 within a group by sending a command on the power communication line 465 to request the sensor data for all sensor circuits 460 coupled to that power communication line 465. The sensor circuits 460 output their respective sensor data on their output pins 426, which is received at the control circuit 410 by respective sensor input pins (RTS-n) corresponding to each column. By making the readback request on the row via the power communication line 465, and reading the data on the column-based readback lines 425 tied to the RTS pins, the data from each sensor circuit 460 can be uniquely read by the control circuit 410 without necessarily assigning unique addresses to the sensor circuits 460.

Alternatively, the sensor circuits 460 could have unique addresses. For example, in an embodiment, the sensor circuits 460 may be preconfigured with addresses. Alternatively, the readback lines 425 may be bidirectional and the power communication lines 465 can be used in conjunction with the bidirectional readback line 425 to assign unique addresses to each sensor circuit 460. If addresses are assigned, the control circuit 410 can request sensor information from multiple sensor circuits 460 at the same time as long as only one sensor 460 outputs to the same readback path 425 at a time.

FIG. 4 only illustrates the connectivity of groups of sensor circuits 460 in a display device 400 but does not expressly illustrate the driver circuits 150 and LED zones 140. These additional zone ICs 120 may be connected to each other and to the control circuit 410 according to any of the configurations described above. In further embodiments, a group driver circuits 150 having any of the connectivity configurations described above may share a common power communication line 465 with a group of the sensor circuits 460 having the connectivity configuration of FIG. 4.

The array of sensor circuits 460 illustrated in FIG. 4 may be physically positioned so that sensor circuits 460 are interleaved within an array of driver circuits 150 and corresponding LED zones 140. This enables the sensor circuits 460 to detect conditions (e.g., temperature or channel voltage) relevant to operation of nearby driver circuits 150 and LED zones 140. The control circuit 410 may correlate the sensed data with nearby driver circuits 150 to individually calibrate driver circuits 150 or control other parameters of the display device 400 affected by the sensed condition.

Figure 5:
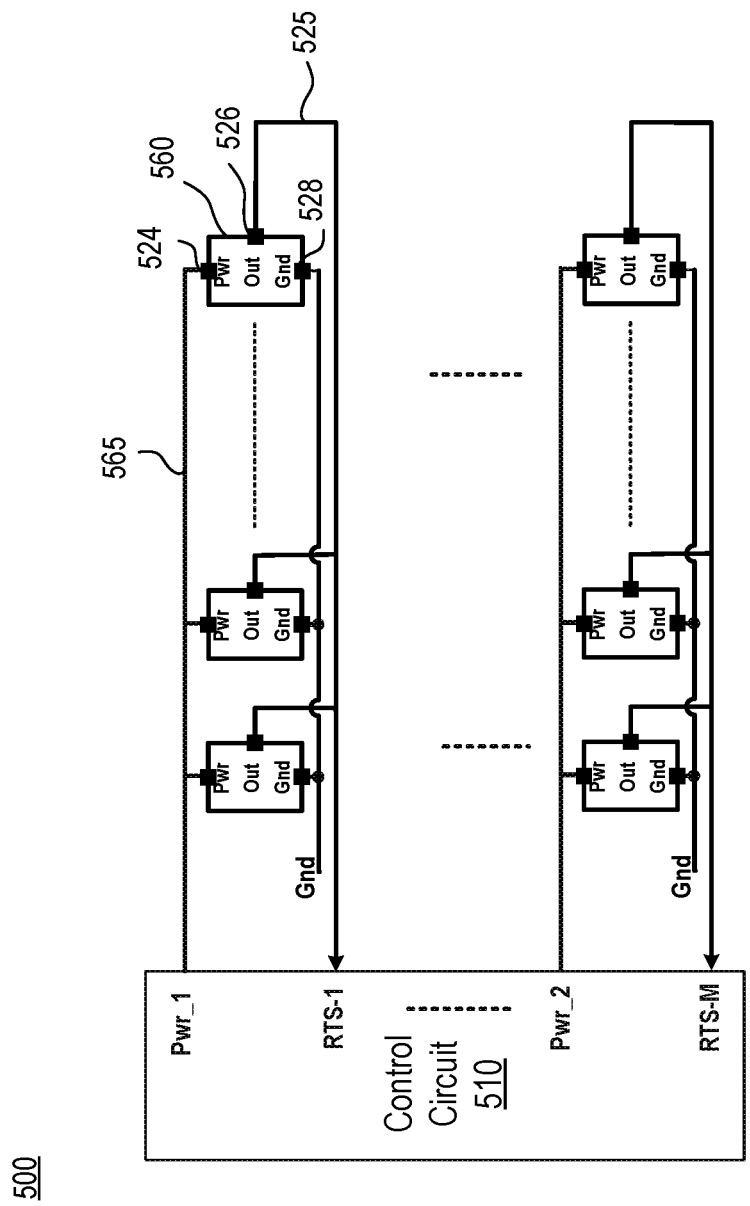
FIG. 5 is a circuit diagram of a display device including an array of sensor circuits arranged in groups coupled to receive commands via a first shared line and to provide readback data via a second shared line, according to one embodiment.

FIG. 5 illustrates another connectivity configuration between a control circuit 510 and an array of sensor circuits 560 within a display device 500. Each of the sensor circuits 560 includes a power line communication pin 524, an output pin 526, and a ground pin 528. Sensor circuits 560 within a group (e.g., a row) are coupled to a common power communication line 565 via their power line communication pins 524 and to a common readback line 525 via their output pins 526. In an alternative configuration, the sensor circuit 560 may comprise a 4-pin device coupled to separate power lines and command lines in place of the power communication line 565.

In an embodiment, each of the sensor circuits 560 stores a pre-programmed address so that the control circuit 510 can uniquely access each sensor circuit 560 within a group. In this situation, the control circuit could 510 can issue a power line communication command on the power communication line 565 that includes an address, and the targeted sensor circuit 560 provides the sensed data on the shared readback line 525 via its output pin 526. In instances where there is only a single sensor circuit 560 of a particular type in each group, then addressing is not necessarily required.

In another embodiment, all the sensor circuits 560 in a group provide sensed data in response to a request. In the case that the sensor circuits 560 do not have individual addresses, the control circuit 510 may combine the results in each group. For example, the control circuit 510 may determine an average, minimum, or maximum of the sensed data returned by each of the sensors 560 in the group. In this implementation, the sensor circuits 560 may employ a mechanism to avoid data collisions on the parallel readback line 525. For example, in one communication protocol, the sensor circuits 560 the sensor circuits 560 output a request to gain control of the readback line 525 prior to outputting sensed data. Absent an acknowledgement that the readback line 525 is available, the sensor circuits 560 wait for a period of time before trying again. In an embodiment, the sensor circuits 560 may utilize a randomization mechanism to control their initial response time to a command, thereby reducing the likelihood of data collisions.

FIG. 5 only illustrates the connectivity of the groups of sensor circuits 560 in the display device 500 and does not expressly illustrate the driver circuits 150 and corresponding LED zones 140. These additional zone ICs 120 may be connected to each other and to the control circuit 510 according to any of the configurations described above. In further embodiments, a group driver circuits 150 having any of the connectivity configurations described above may share a common power communication line 565 with a group of the sensor circuits 560 having the connectivity configuration of FIG. 5.

Figure 6:
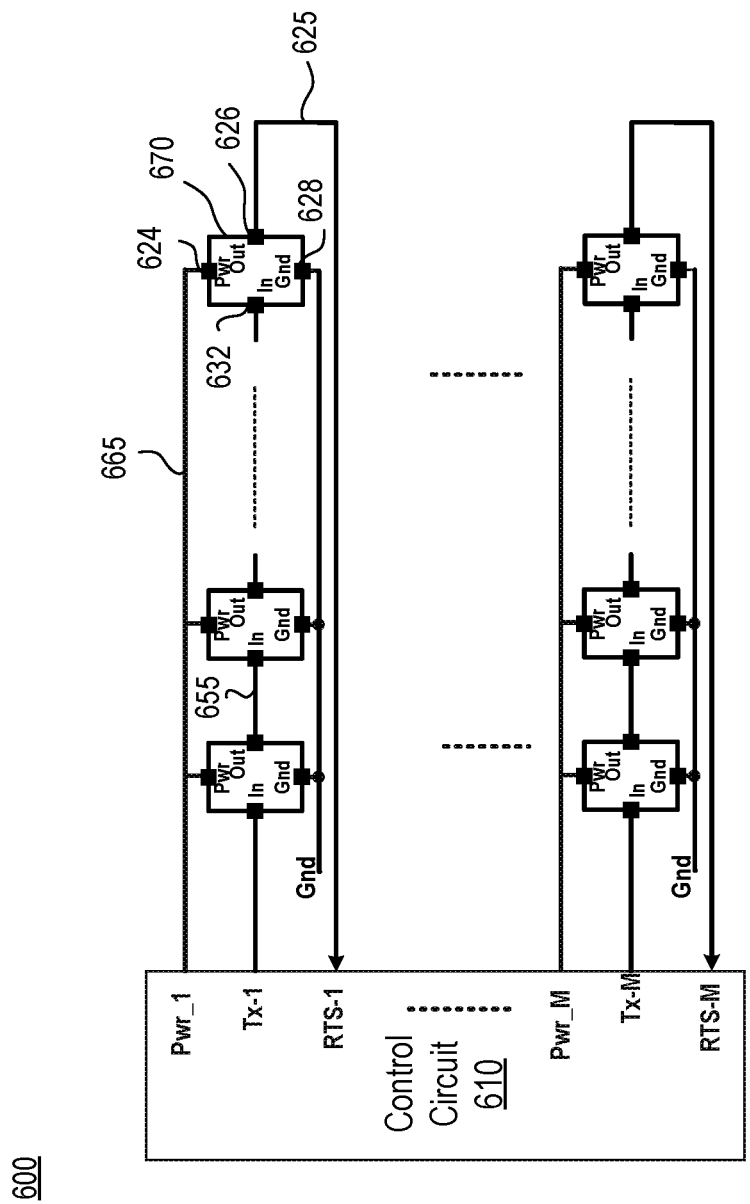
FIG. 6 is a circuit diagram of a display device including an array of sensor circuits arranged in groups coupled to receive commands via serial connections and to provide readback data via a shared parallel communication line, according to one embodiment.

FIG. 6 illustrates another connectivity configuration between a control circuit 610 and an array of sensor circuits 660 in a display device 600. Each sensor circuit 660 includes a power line communication pin 624, an input pin 632, an output pin 626, and a ground pin 628. The sensor circuits 660 are arranged in groups (e.g., a rows) each coupled to a common power communication line 665 via their power line communication pins 624. The sensor circuits 660 are also serially coupled to each other and to the control circuit 610 via serial communication lines 655 between the input pin 632 and output pin 626 of adjacent sensor circuits 660 and between the control circuit 610 and the first and last sensor circuit 660 in each group (e.g., each row). The sensor circuits 660 may perform serial communication via the serial communication lines 655 to facilitate address assignment and to communicate sensor data to the control circuit 610 as described above. In an alternative configuration, the sensor circuit 660 may comprise a 5-pin device coupled to separate power lines and command lines in place of the power communication line 665.

FIG. 6 only illustrates the connectivity of the groups of sensor circuits 660 in the display device 600 and does not expressly illustrate the driver circuits 150 and corresponding LED zones 140. These additional zone ICs 120 may be connected to each other and to the control circuit 510 according to any of the configurations described above. In further embodiments, a group driver circuits 150 having any of the connectivity configurations described above may share a common power communication line 665 with a group of the sensor circuits 660 and may be coupled in the same serial communication chain as the sensor circuits 660 having the connectivity configuration of FIG. 6.

Figure 7:
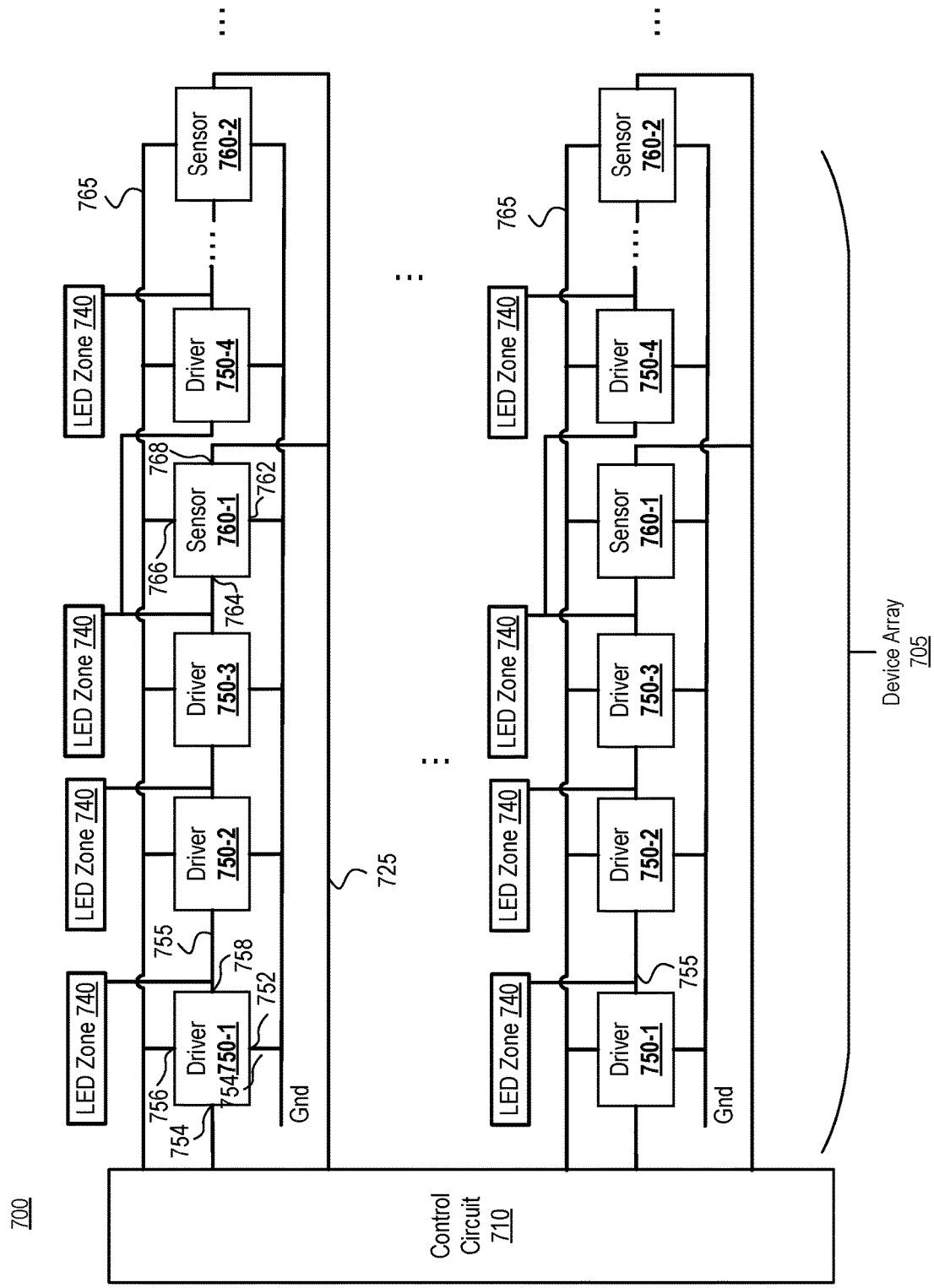
FIG. 7 is a circuit diagram of a display device including an array of zone ICs arranged in groups including a mixture of driver circuits and sensor circuits that share common communication and supply lines.

FIG. 7 illustrates an example embodiment of a display device 700 that includes a device array 705 with a mixture of driver circuits 750 and sensor circuits 760 in each group (e.g., a row). In the illustrated embodiment, the driver circuits 750 include an input pin 754, a power line communication pin 756, one or more output pins 758, and a ground pin 752. In an embodiment, the output pins 758 may comprise a set of multiple pins on each driver circuit 750 to control multiple channels of the LED zone 740. For example, the output pins 758 may each include 3 pins per driver circuit 750 to control red, green, and blue channels of the LED zones 740.

The ground pin 752 is configured to provide a path to a ground line for the driver circuit 750. The power line communication input pin 756 is configured to receive a power line communication signal from the control circuit 710 via the common power communication line 765. The data input pin 752 and the output pin 758 are coupled to the serial communication lines 755 to facilitate serial communication to and from the driver circuits 750. The serial communication lines 755 may be used, for example, to assign addresses to the driver circuits 750 or to propagate readback data to the control circuit 710 in response to commands as described above. The output pin 758 serves a dual-purpose dependent on the mode of operation. In the addressing mode and during readback operations, the output pin 758 facilitates communications on the serial communication lines 755 as described above. The output pin 758 is also coupled to sink current from a corresponding LED zone 740 to control supply of the driver current. The driver circuits 750 may time the serial communications to occur when the LED zones 740 are not actively being driven to avoid interference with the operation of the LED zones 740. Thus, in one embodiment, serial communication is performed only during the times when an LED driver turns off the current to its corresponding LED zone 740. When using PWM dimming, the driver circuit 750 turns off the current to the LED zone 740 once every cycle according to its programmed duty cycle.

The sensor circuits 760 include an input pin 764, a power line communication pin 766, an output 768, and a ground pin 762. The ground pin 762 is coupled to ground. The power line communication input pin 766 is configured to receive readback commands from the control circuit 710 via the common power communication line 765. The data input pin 764 is coupled to the dual purpose output pin 758 of an adjacent driver circuit 750 and can therefore receive serial communications from the adjacent driver circuit 750 and can sense the channel voltage of the LED zone 740. The output pin 768 is coupled to a shared readback line 725 for providing readback data to the control circuit 110.

Within each group, the driver circuits 750 and sensor circuits 760 share a common power communication line 765. The driver circuits 750 are also coupled serially to each other and to the control circuit 710 via the serial communication lines 755. Here, a driver circuit 750-4 adjacent to a sensor circuit 760-1 may have its input pin 756 coupled to the output of the previous driver circuit 750-3, bypassing the sensor circuit 760-1. The sensor circuits 760 have input pins 764 coupled to the output pin 758 of an adjacent driver circuit 750 and an output pin 768 coupled in parallel to a single wire readback line 725.

In an addressing mode, the above-described addressing scheme may facilitate assignment of addresses to the driver circuits 750 via the serial communication lines 755. Because the sensor circuits 760 have input pins 764 sharing a common connection with the input pin 754 of an adjacent driver circuit 750, the sensor circuit 760 and adjacent driver circuit 750 may obtain a common address. For example, the sensor circuit 760-1 shares a common address with the driver circuit 750-4 but may respond to different commands so the circuits 760-1, 750-4 do not execute commands intended for the other circuit even though they have the same address.

In an embodiment, the sensor circuits 760 comprise temperature-voltage sensing circuits ("T-V" circuits) that can sense both temperature and the channel voltage of the LED zone 740 coupled to their respective input pins 764. In operation, the sensor circuit 760 receives a command via the power communication line 765 requesting a temperature reading, a channel voltage reading, or both, senses the relevant data, and outputs a result via its output pin 768 to the readback line 725.

In an embodiment, the number of commands sent via the power communication line 765 can be reduced by utilizing a single command that instructs every sensor circuit 760 on the power communication line 765 to output its sensor data and its address to the readback line 725. Since the address is sent with the data, the control circuit 710 can distinguish which sensor circuit 760 provided the data. In an embodiment, the sensor circuits 760 can stagger the timing of their outputs to the readback line 725 in order to avoid data collisions. For example, when one sensor circuit 760 is outputting data on the readback line 725, the other sensors 760 wait for its transfer to finish before starting their own transfers. In another embodiment, a power line communication command instructs the sensor circuits 760 to continuously or periodically output their address, voltage, and temperature data on the readback line 725. This command does not necessarily have to be issued more than once, and therefore avoids congestion on the power communication line 765.

In an embodiment, the sensor circuits 760 may be configured during a configuration mode after addressing, similar to the driver circuits 750. For example, the control circuit 710 may configure the sensor circuits 760 to output sensor data at specified timing. In an embodiment, the sensor circuits 760 may monitor the power communication line 765 to determine, based on the driver control signals, when an adjacent driver circuit 750 will be actively driving its LED zone 740. The sensor circuits 760 may output sensor data during specific times relative to the determined driving periods to avoid data collisions with other sensor circuits 760 on the shared readback line 725. For instance, if there are four sensor circuits 760 coupled to one power communication line 765, the first sensor circuit 760 may be configured to output during the first 25% of the frame, the second sensor circuit 760 could be configured to output during the second 25% of the frame period, and so on.

In other embodiments, the sensor circuits 760 are not necessarily temperature and/or voltage sensors. Other sensor circuits 760 may be used to measure parameters such as pressure, vibration, radiation, light, or a combination thereof. For example, a sensor circuit 760 may measure temperature, voltage, and light (a "T-V-L" sensor). Here, the control circuit 710 may use the light information to control a self-calibrating display. The emitted light from each LED zone 740 or selected LED zones 740 may be detected, and the control circuit 710 can adjust the LED current and/or the PWM duty cycle so that each LED zone 740 provides the same or similar light output when driven by the same brightness signal.

In different embodiments any number of sensors 760 could be placed with any group of driver circuits 720 at arbitrary positions using the above-described connectivity configuration.

Figure 8A:
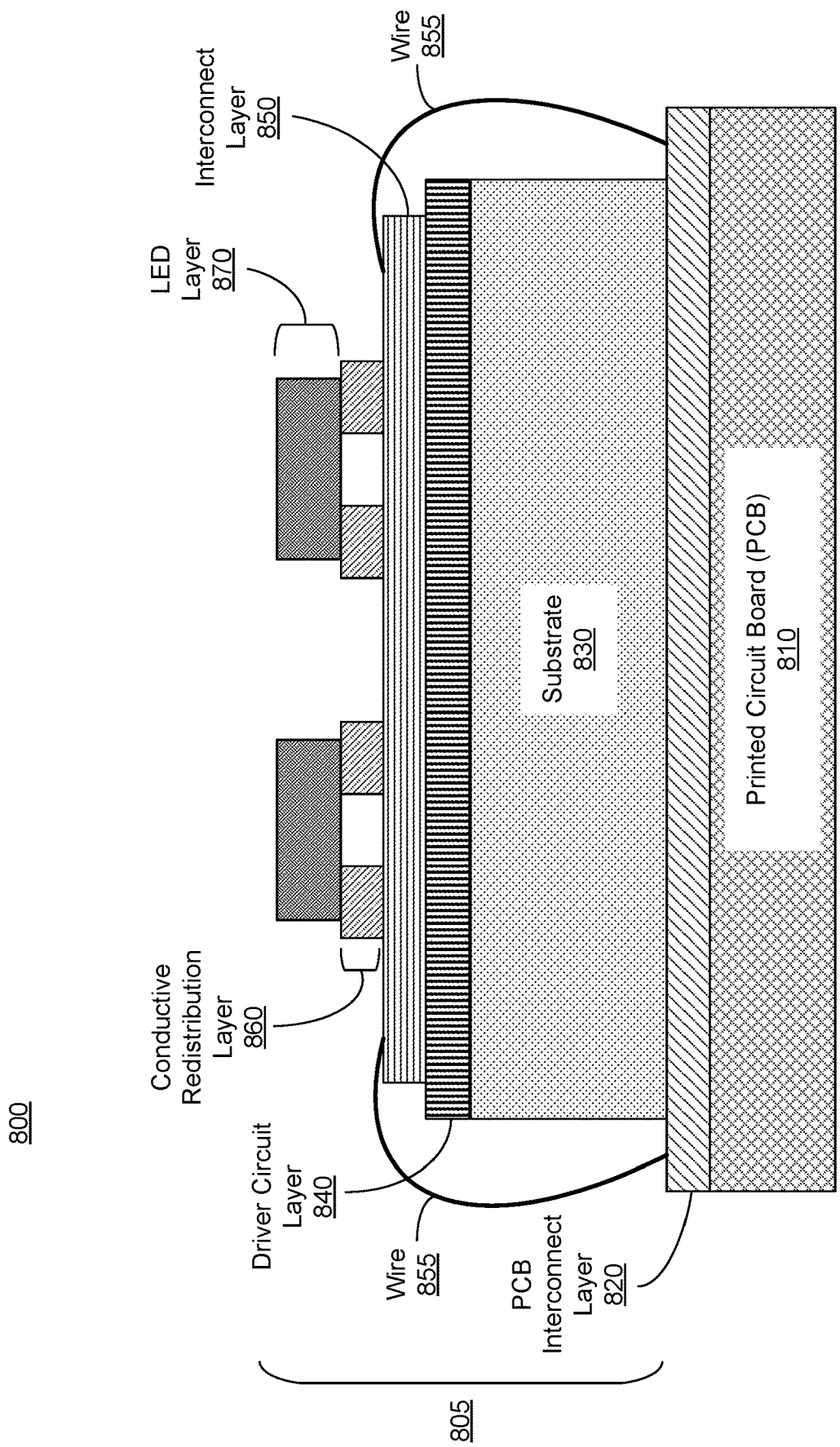
FIG. 8A is a cross sectional view of a first embodiment of an LED and driver circuit that may be utilized in a display device.
Figure 8B:
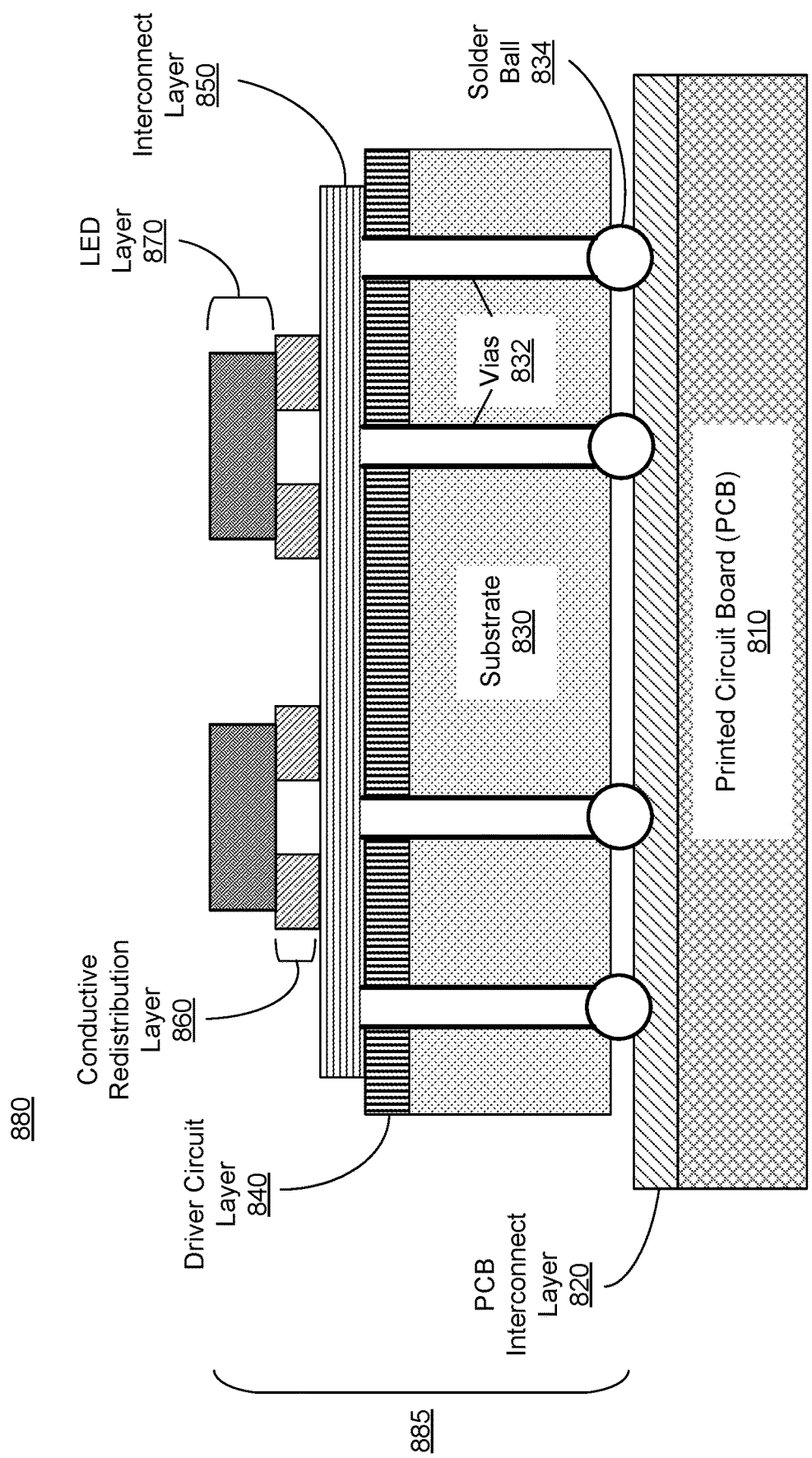
FIG. 8B is a cross sectional view of a second embodiment of an LED and driver circuit that may be utilized in a display device.
Figure 8C:
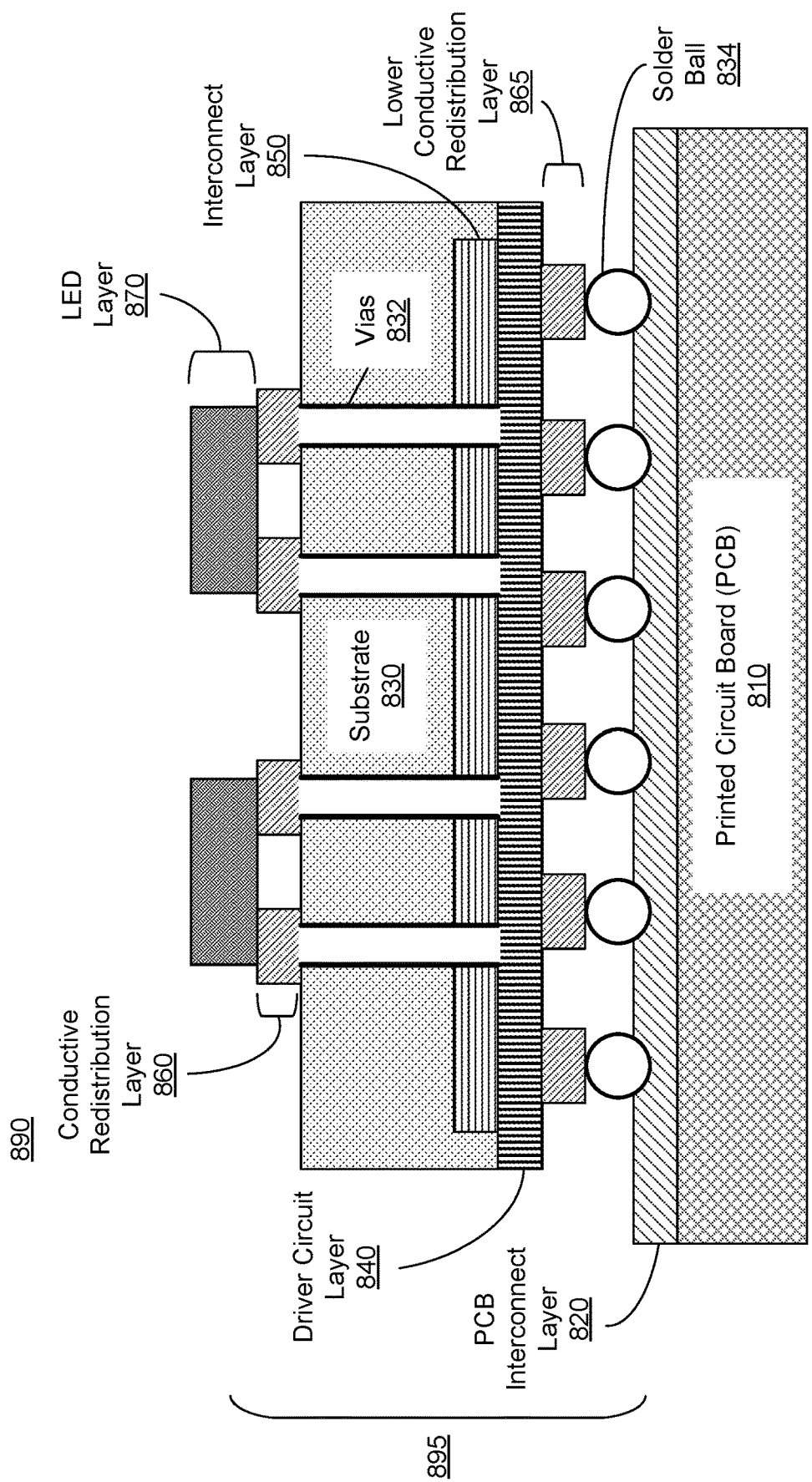
FIG. 8C is a cross sectional view of a third embodiment of an LED and driver circuit that may be utilized in a display device.
Figure 9:
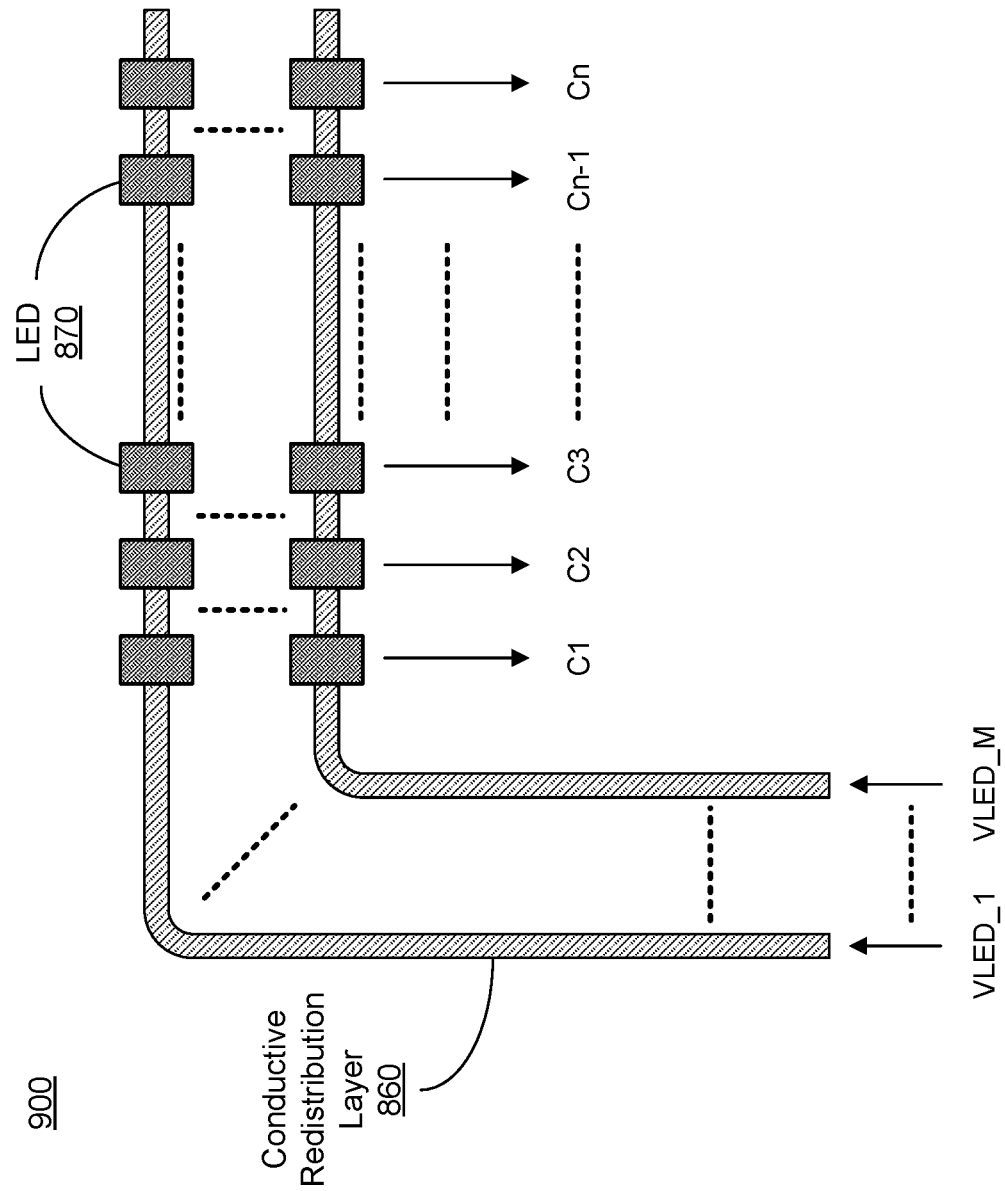
FIG. 9 is a top down view of a display device using an LED and driver circuit, according to one embodiment.
Figure 10:
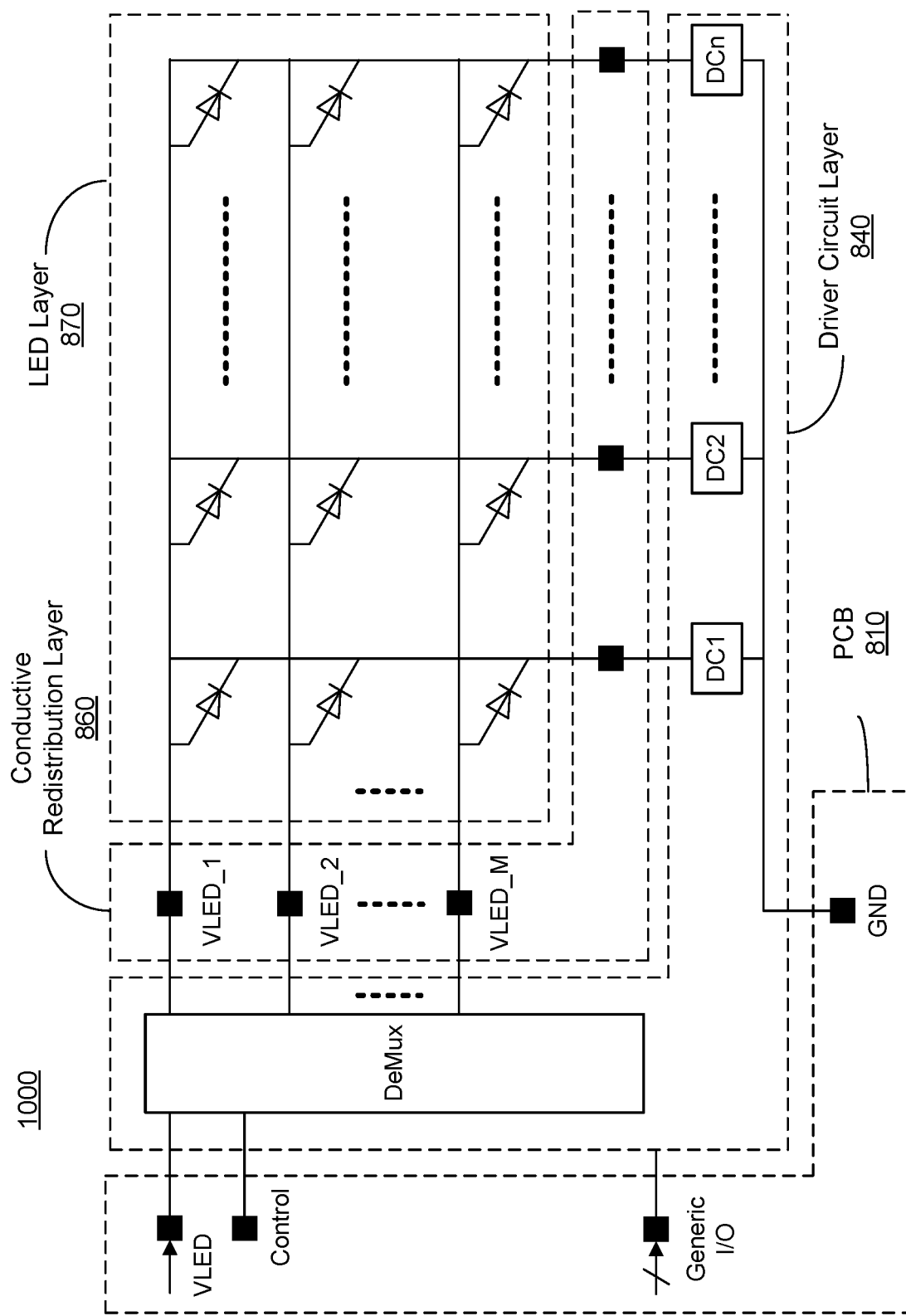
FIG. 10 illustrates a schematic view of several layers of an LED and driver circuit for a display device, according to one embodiment.

FIGS. 8-10 illustrate an example embodiment of an integrated package for a display device 800 that includes an integrated driver circuit 150 and LED zone 140. This architecture enables the driver circuits 150 to be distributed in the display area of the display device 800 adjacent to their respective LED zones 140. Other structures such as sensor circuits 160 are not shown in FIGS. 8-10 may be similar integrated in a common package together with the driver circuit 150 and LED zone 140.

FIG. 8A is a cross sectional view of a first embodiment of a display device 800 including an integrated LED and driver circuit 805. In the example shown in FIG. 8A, the circuit 800 includes a printed circuit board (PCB) 810, a PCB interconnect layer 820, and the integrated LED and driver circuit 805 which comprises a substrate 830, a driver circuit layer 840, an interconnect layer 850, a conductive redistribution layer 860, and an LED layer 870. Bonded wires 855 may be included for connections between the PCB interconnect layer 820 and the integrated LED and driver circuit 805. The PCB 810 comprises a support board for mounting the integrated LED and driver circuit 805, the control circuit 110 and various other supporting electronics. The PCB 810 may include internal electrical traces and/or vias that provide electrical connections between the electronics. A PCB interconnect layer 820 may be formed on a surface of the PCB 810. The PCB interconnect layer 820 includes pads for mounting the various electronics and traces for connecting between them.

The integrated LED and driver circuit 805 includes a substrate 830 that is mountable on a surface of the PCB interconnect layer 820. The substrate 830 may be, e.g., a silicon (Si) substrate. In other embodiments, the substrate 830 may include various materials, such as gallium arsenide (GaAs), indium phosphide (InP), gallium nitride (GaN), AlN, sapphire, silicon carbide (SiC), or the like.

A driver circuit layer 840 may be fabricated on a surface of the substrate 830 using silicon transistor processes (e.g., BCD processing) or other transistor processes. The driver circuit layer 840 may include one or more driver circuits 150 (e.g., a single driver circuit 150 or a group of driver circuits 150 arranged in an array). An interconnect layer 850 may be formed on a surface of the driver circuit layer 840. The interconnect layer 850 may include one or more metal or metal alloy materials, such as Al, Ag, Au, Pt, Ti, Cu, or any combination thereof. The interconnect layer 850 may include electrical traces to electrically connect the driver circuits 150 in the driver circuit layer 840 to wire bonds 855, which are in turn connected to the control circuit 110 on the PCB 810. In an embodiment, each wire bond 855 provides an electrical connection for the various connections described above.

In an embodiment, the interconnect layer 850 is not necessarily distinct from the driver circuit layer 840 and these layers 840, 850 may be formed in a single process in which the interconnect layer 850 represents a top surface of the driver layer 840.

The conductive redistribution layer 860 may be formed on a surface of the interconnect layer 850. The conductive redistribution layer 860 may include a metallic grid made of a conductive material, such as Cu, Ag, Au, Al, or the like. An LED layer 870 includes LEDs that are on a surface of the conductive redistribution layer 860. The LED layer 870 may include arrays of LEDs arranged into the LED zones 140 as described above. The conductive redistribution layer 860 provides an electrical connection between the LEDs in the LED layer 870 and the one or more driver circuits in the driver circuit layer 840 for supplying the driver current and provides a mechanical connection securing the LEDs over the substrate 830 such that the LED layer 870 and the conductive redistribution layer 860 are vertically stacked over the driver circuit layer 840.

Thus, in the illustrated circuit 800, the one or more driver circuits 150 and the LED zones 140 including the LEDs are integrated in a single package including a substrate 830 with the LEDs in an LED layer 870 stacked over the driver circuits 150 in the driver circuit layer 840. By stacking the LED layer 870 over the driver circuit layer 840 in this manner, the driver circuits 150 can be distributed in the display area 105 of a display device 100.

FIG. 8B is a cross sectional view of a second embodiment of a display device 880 including an integrated LED and driver circuit 885, according to one embodiment. The device 880 is substantially similar to the device 800 described in FIG. 8A but utilizes vias 832 and corresponding connected solder balls 834 to make electrical connections between the driver circuit layer 840 and the PCB 810 instead of the wires 855. Here, the vias 832 are plated vertical electrical connections that pass completely through the substrate layer 830. In one embodiment, the substrate layer 830 is a Si substrate and the through-chip vias 832 are Through Silicon Vias (TSVs). The through-chip vias 832 are etched into and through the substrate layer 830 during fabrication and may be filled with a metal, such as tungsten (W), copper (C), or other conductive material. The solder balls 834 comprise a conductive material that provide an electrical and mechanical connection to the plating of the vias 832 and electrical traces on the PCB interconnect layer 820. In one embodiment, each via 832 provides an electrical connection for providing signals such as the driver control signal from the control circuit 110 on the PCB 810 to a group of driver circuits 150 on the driver circuit layer 840. The vias 832 may also provide connections for the incoming and outgoing addressing signals, the supply voltage (e.g., VLED) to the LEDs in a LED zone 140 on the LED layer 870, and a path to a circuit ground (GND).

FIG. 8C is a cross sectional view of a third embodiment of a display device 890 including an integrated LED and driver circuit 895. The device 890 is substantially similar to the device 880 described in FIG. 8B but includes the driver circuit layer 840 and interconnect layer 850 on the opposite side of the substrate 830 from the conductive redistribution layer 860 and the LED layer 870. In this embodiment, the interconnect layer 850 and the driver circuit layer 840 are electrically connected to the PCB 810 via a lower conductive redistribution layer 865 and solder balls 834. The lower conductive redistribution layer 865 and solder balls 834 provide mechanical and electrical connections (e.g., for the driver control signals) between the driver circuit layer 840 and the PCB interconnect layer 820. The driver circuit layer 840 and interconnect layer 850 are electrically connected to the conductive redistribution layer 860 and the LEDs of the LED layer 870 via one or more plated vias 832 through the substrate 830. The one or more vias 832 seen in FIG. 8C may be utilized to provide the driver currents from the driver circuits in the driver circuit layer 840 to the LEDs in the LED layer 870 and other signals as described above.

In alternative embodiments, the integrated driver and LED circuits 805, 885, 895 may be mounted to a different base such as a glass base instead of the PCB 810.

FIG. 9 is a top down view 900 of a display device using an integrated LED and driver circuit, according to one embodiment. The circuit can correspond to a top view of any of the integrated LED and driver circuits 805, 885, 895 depicted in FIGS. 8A-C. A plurality of LEDs of an LED zone 870 are arranged in rows and columns (e.g., C1, C2, C3, . . . Cn−1, Cn) in FIG. 9. For passive matrix architectures, each row of LEDs is connected by a conductive redistribution layer 860 to a demultiplexer which outputs a plurality of VLED signals (i.e., VLED_1 . . . VLED_M). The VLED signals provide power (i.e., a supply voltage) to a corresponding row of LEDs via the conductive redistribution layer 860.

FIG. 10 illustrates a schematic view 1000 of several layers of a display device with an integrated LED and driver circuit, according to one embodiment. The schematic view includes the PCB 810, the driver circuit layer 840, the conductive redistribution layer 860, and the LED layer 870 as described in FIGS. 8A-C. The schematic of FIG. 10 shows circuit connections for the circuits 805, 885, 895 of FIGS. 8A-C but does not reflect the physical layout. As described above, in the physical layout, the LED layer 870 is positioned on top of (i.e., vertically stacked over) the conductive redistribution layer 860. The conductive redistribution layer 860 is positioned on top of the driver circuit layer 840 and the driver circuit layer 840 is positioned on top of the PCB 810.

The PCB 810 includes a connection to a power source supplying power (e.g., VLED) to the LEDs, a control circuit for generating a control signal, generic I/O connections, and a ground (GND) connection. The driver circuit layer 840 includes a plurality of driver circuits (e.g., DC1, DC2, . . . DCn) and a demultiplexer DeMux. The conductive redistribution layer 860 provides electrical connections between the driver circuits and the demultiplexer DeMux in the driver circuit layer 840 to the plurality of LEDs in the LED layer 870. The LED layer 870 includes a plurality of LEDs arranged in rows and columns. In this example implementation, each column of LEDs is electrically connected via the conductive redistribution layer 860 to one driver circuit in the driver circuit layer 840. The electrical connection established between each driver circuit and its respective column of LEDs controls the supply of driver current from the driver circuit to the column. In this embodiment each diode shown in the LED layer corresponds to an LED zone. Each row of LEDs is electrically connected via the conductive redistribution layer 860 to one output (e.g., VLED_1, VLED_2, . . . VLED_M) of the demultiplexer DeMux in the driver circuit layer 840. The demultiplexer DeMux in the driver circuit layer 840 is connected to a power supply (VLED) and a control signal from the PCB 810. The control signal instructs the demultiplexer DeMux which row or rows of LEDs are to be enabled and supplied with power using the VLED lines. Thus, a particular LED in the LED layer 870 is activated when power (VLED) is supplied on its associated row and the driver current is supplied to its associated column.

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope described herein.

The invention claimed is:

1. A display device comprising:
   an array of light emitting diode zones each comprising one or more light emitting diodes that generate light in response to respective driver currents;
   an array of driver circuits distributed in the display area of the display device, the array of driver circuits to each drive a respective light emitting diode zone by controlling the respective driver currents in response to driver control signals;
   an array of sensor circuits distributed in display area of the display device, the array of sensor circuits to output respective readback signals including sensor data in response to command signals; and
   a control circuit to receive the respective readback signals from the sensor circuits and to control operation of the display device based at least in part on the respective readback signals, the control circuit furthermore to generate the command signals for requesting the readback signal, and to generate the driver control signals to control operation of the driver circuits.

2. The display device of claim 1,
   wherein the array of driver circuits are arranged in groups of driver circuits each sharing a common command line for providing the driver control signals and common power supply lines, and
   wherein the array of sensor circuits are arranged in groups of sensor circuits each sharing a common command line for providing the command signals and common power supply lines.

3. The display device of claim 1, wherein the array of driver circuits and the array of sensor circuits are arranged in mixed groups of driver circuits and sensors circuits, wherein each mixed group shares a common command line for providing the driver control signals and the driver control signals, and shares common power supply lines.

4. The display device of claim 1, further comprising:
a set of shared lines including a first subset of shared lines coupling sensor circuits along a first dimension of the array of sensor circuits and a second subset of the shared lines coupling sensor circuits along a second dimension of the array of the sensor circuits, the first subset of the shared lines to communicate the command signals from the control circuit to the sensor circuits and the second subset of the shared lines to communicate the readback signals from the sensor circuits to the control circuit.

5. The display device of claim 4, wherein the first dimension corresponds to a row and wherein the second dimension corresponds to a column.

6. The display device of claim 4, wherein the first subset of shared lines are further coupled to driver circuits along the first dimension to provide the driver control signals to the driver circuits for driving the LED zones.

7. The display device of claim 1, further comprising:
a set of shared lines including a first shared line and a second shared line coupled to each sensor circuit in a group of sensor circuits, the first shared line to communicate the command signals from the control circuit to the group of sensor circuits and the second shared line to communicate the readback signals from the groups of sensor circuits to the control circuit.

8. The display device of claim 7, wherein the group of sensor circuits comprises a row of sensor circuits.

9. The display device of claim 7, wherein the first shared line is further coupled to a group of driver circuits to provide the driver control signals to the driver circuits for driving the LED zones.

10. The display device of claim 1, further comprising:
a set of serial communication lines serially coupling a group of sensor circuits to each other and to the control circuit in a serial communication chain, wherein the group of sensor circuits communicate the readback signals to the control circuit through the serial communication chain.

11. The display device of claim 10, wherein the group of sensor circuits communicate the readback signals in a forward direction through sensor circuits successively further from the control circuit and via a readback line coupling the last sensor circuit in the serial communication chain to the control circuit.

12. The display device of claim 10, wherein the group of sensor circuits communicate the readback signals in a reverse direction through sensor circuits successively closer to the control circuit.

13. The display device of claim 10, further comprising:
a shared line coupling the group of sensor circuits in parallel to provide the command signals from the control circuit to the group of sensor circuits.

14. The display device of claim 10, wherein the command signals are sent from the control circuit to the group of sensor circuits via the set of serial communication lines.

15. The display device of claim 1, further comprising:
a set of serial communication lines serially coupling a group of driver circuits to each other and to the control circuit in a serial communication chain, wherein the group of driver circuits each obtain respective addresses based on addressing signals propagated through the serial communication chain during an addressing mode and each driver circuits stores the respective addresses,
wherein sensor circuits of the sensor circuit array are each coupled to receive and store a common addressing signal with respective adjacent driver circuits;
a shared command line for sending the driver control signals to the group of driver circuits and for sending the command signals to the sensor circuits, the driver control signals and command signals including a target address for targeting one of the group of driver circuits or the sensor circuits;
a shared readback line coupled to the sensor circuits to communicate the readback signals from the sensor circuits to the control circuit in response to the command signals.

16. The display device of claim 1, wherein each of the LED zones and corresponding driver circuit are stacked over a substrate in an integrated package.

17. The display device of claim 1, wherein the sensor circuits comprise at least one of: a channel voltage sensing circuit, a temperature sensing circuit, and a light sensing circuit.

18. A display device comprising:
an array of light emitting diode zones each comprising one or more light emitting diodes that generate light in response to respective driver currents;
an array of zone integrated circuits distributed in the display area of the display device, the array of zone integrated circuits arranged in groups that share a common command line and common power supply lines, wherein each group of zone integrated circuits includes:
at least one driver circuit to drive a respective light emitting diode zone by controlling the respective driver currents in response to driver control signals; and
at least one sensor circuit to output respective readback signals including sensor data in response to command signals; and
a control circuit to receive the respective readback signals from the sensor circuits and to control operation of the display device based at least in part on the readback signals, the control circuit furthermore to generate the command signals for requesting the readback signal, and to generate the driver control signals to control operation of the driver circuits.

19. The display device of claim 18, further comprising:
a set of serial communication lines to couple the control circuit and a group of the zone integrated circuits in a serial communication chain, wherein the control circuit facilitates assignment of addresses to the zone integrated circuits via the serial communication chain.

20. A method for operating a display device comprising:
generating, by a control circuit, command signals for requesting readback signals from a plurality of sensor circuits distributed in a display area of the display device;
receiving the readback signals from the sensor circuits in response to the command signals;
generating based on image data and the readback signals, control parameters for controlling operation of the display device; and
driving, by an array of driver circuits distributed in the display area of the display device, light emitting diode zones based on the control parameters.

* * * * *